United States Patent [19]
Shoji

[11] Patent Number: 5,378,553
[45] Date of Patent: Jan. 3, 1995

[54] BATTERY CASE ATTACHING UNIT INCLUDING HOUSING AND BATTERY CASE AND STOPPER FOR SECURING BATTERY CASE IN HOUSING

[75] Inventor: Masao Shoji, Osaka, Japan

[73] Assignee: Cat Eye Co., Ltd., Osaka, Japan

[21] Appl. No.: 29,176

[22] Filed: Mar. 10, 1993

[30] Foreign Application Priority Data

Mar. 13, 1992 [JP] Japan .................. 4-012772[U]

[51] Int. Cl.6 ............................................. H01M 2/10
[52] U.S. Cl. ................................. 429/97; 429/98; 362/72; 362/191
[58] Field of Search .............. 429/96, 97, 98, 100; 362/9, 72, 191, 194, 195

[56] References Cited

U.S. PATENT DOCUMENTS

| | | | |
|---|---|---|---|
| 4,146,682 | 3/1979 | Nakao | 429/100 X |
| 5,039,580 | 8/1991 | Mori et al. | 429/97 |
| 5,144,546 | 9/1992 | Burdi | |

FOREIGN PATENT DOCUMENTS

| | | |
|---|---|---|
| 3144034A | 5/1983 | Germany . |
| 170896A | 2/1985 | United Kingdom . |

OTHER PUBLICATIONS

English version of the search report from the EPO (Jun. 1993).

*Primary Examiner*—Stephen Kalafut
*Attorney, Agent, or Firm*—Allegretti & Witcoff, Ltd.

[57] ABSTRACT

A battery case accommodating a battery is inserted into a battery case housing of a head lamp body. As the battery case is inserted, one protrusion of a stopper held by a stopper holding portion of the housing moves downward through an opening. When accommodation of the battery case is completed, another protrusion of the stopper as well as the one protrusion returns upward, and the former protrusion is fitted in a recess of the battery case to prevent movement of the battery case. When the head lamp body is attached to a bracket fixed on a bicycle in that state, a protrusion of the bracket prevents movement of the one protrusion of the stopper.

6 Claims, 6 Drawing Sheets

BATTERY CASE ATTACHING UNIT INCLUDING HOUSING AND BATTERY CASE AND STOPPER FOR SECURING BATTERY CASE IN HOUSING

BACKGROUND OF THE INVENTION

1. Field of the Invention

The present invention relates to a battery case attachment unit and, more specifically, to an attaching unit of a battery case used for a head lamp and the like for a component for bicycles and motorcycles.

2. Description of the Background Art

FIG. 7 is a cross section showing a conventional structure of a head lamp attached to a part of a bicycle. Referring to the figure, a bulb 17 for illuminating ahead through a lens unit 5 is contained in the left side portion of head lamp body 1, while a battery case 3 accommodating a battery therein is accommodated in a battery case housing 4 of the head lamp body 1 on the right side of the figure.

A bracket 7 which is fixed on a handle or the like of the bicycle includes an attaching piece 11 and an attaching piece 13 rotatable around a pin 9, which attaching pieces are fastened to the handle or the like by means of a bolt 14. The head lamp body 1 can be slidably attached on the bracket 7 by fitting on a rail-like protrusion 21 provided on the top surface of the bracket 7 with a groove 19 provided at the lower surface of the head lamp body 1. A stopper 23 is provided between a stopper holding portion 24 on the lower surface of battery case housing 4 of head lamp body 1 and a lower surface of an inserting portion 33 of the accommodated battery case 3. Stopper 23 is formed of an resilient body such as ebonite, and it has a cross section of a vertical V with a protrusion 25 being at or proximate the center.

Attaching and detaching operations of battery case 3 to head lamp body 1 will be described.

After the battery is accommodated therein, battery case 3 is gradually inserted into the battery case housing 4 of head lamp body 1. Before the insertion of battery case 3, protrusion 25 is located at an upper portion. However, when an end portion of battery case 3 is brought into contact with projection 25 as battery case 3 is inserted, protrusion 25 of stopper 23 moves downward against its resiliency. When insertion of battery case 3 is completed in this state, a recess 26 provided at an inserting portion 33 of battery case 3 is positioned corresponding to protrusion 25 of stopper 23. At that position, protrusion 25 of stopper 23 is fixed in recess 26 of battery case 3, and the original shape of stopper 23 is resumed. Thus slipping of battery case 3 from head lamp body 1 can be prevented by the resilient action of stopper 23.

In the conventional battery case attaching unit as described above, what prevents slipping of battery case 3 from head lamp body 1 is only the resilient force of stopper 23. Therefore, if a strong vibration or the like is exerted on head lamp body 1 and such a large force is applied in the direction of slipping of battery case 3 as to exceed the resilient force of stopper 23, battery case 3 may possibly be slipped from head lamp body 1.

SUMMARY OF THE INVENTION

An object of the present invention is to improve reliability in attachment in a battery case attaching unit used for a component for bicycles and motorcycles.

Another object of the present invention is to prevent slipping of battery case caused by vibration or the like, in a battery case attaching unit used for a component for bicycles and motorcycles.

In order to attain the above described objects, the battery case attaching unit includes an attaching piece fixed on a part of a bicycle or a motorcycle; a component for the bicycle or the motorcycle detachably fitted with the attaching piece; a battery case accommodating a battery therein which can be inserted into a housing of the component for the bicycle or the motorcycle; and a stopper provided between a portion of the housing and a portion fitting with the attaching piece having a first protruding portion which moves in a direction of the portion to be fitted with the attaching piece as the battery case is gradually inserted to be accommodated and which returns to the original position when accommodation of the battery case is completed so that it is fitted in a recess provided at the battery case for stopping slipping of the battery case from the housing; whereby a portion of the attaching piece prevents movement of the first protruding portion of the stopper when the component for the bicycle or the motorcycle is fitted with the attaching piece with the battery case accommodated in the housing.

According to the battery case attaching unit structured as described above, when the component for the bicycle or the motorcycle is fitted in the attaching piece with the battery case accommodated therein, movement of the first protruding portion of the stopper is prevented by a portion of the attaching piece. Therefore, attachment of the battery case can be held rigidly, improving reliability of attachment.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
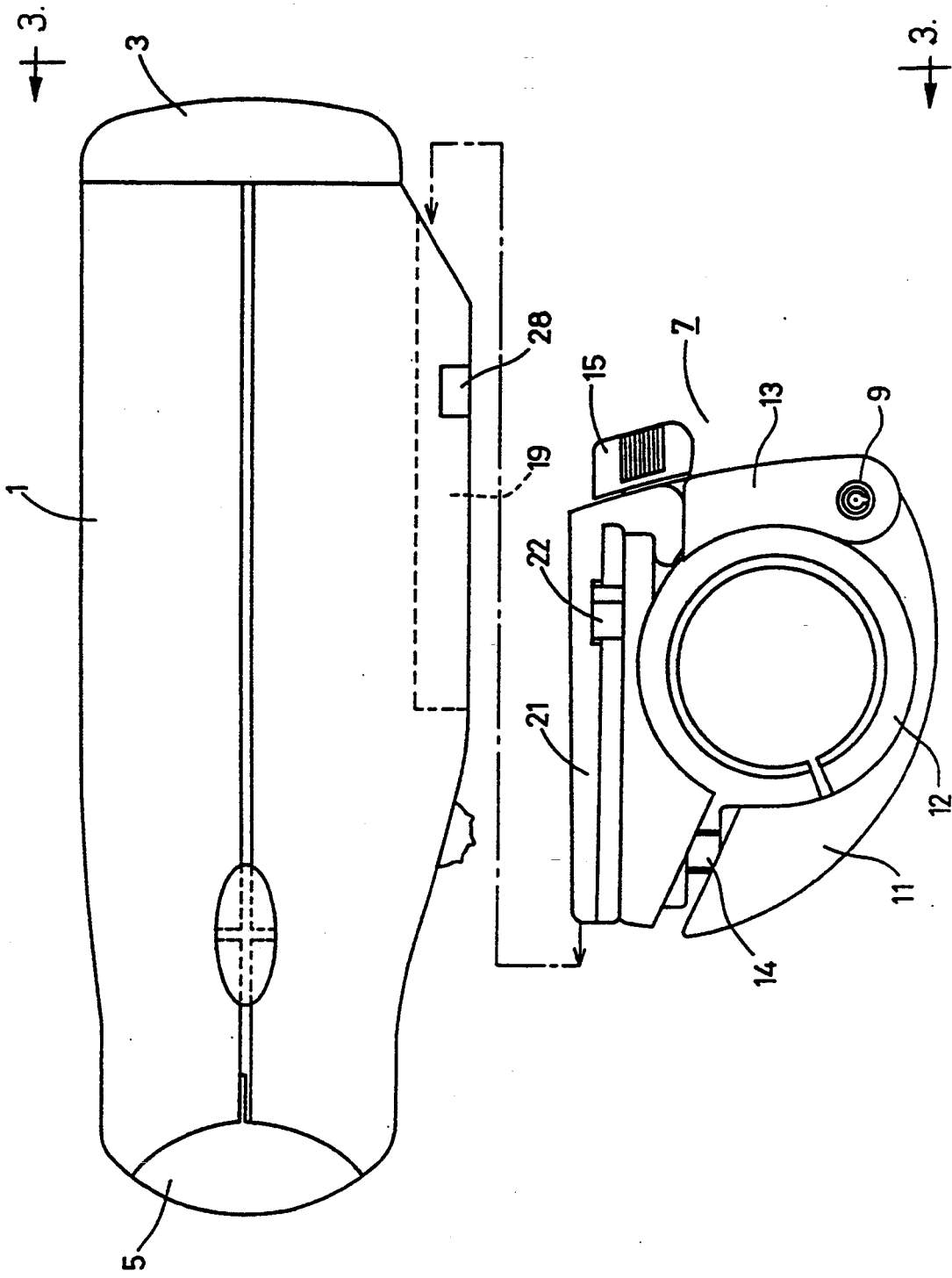
FIG. 2 shows appearances of a component for a bicycle or a motorcycle and an attaching piece for the bicycle in accordance with one embodiment of the present invention.
Figure 3:
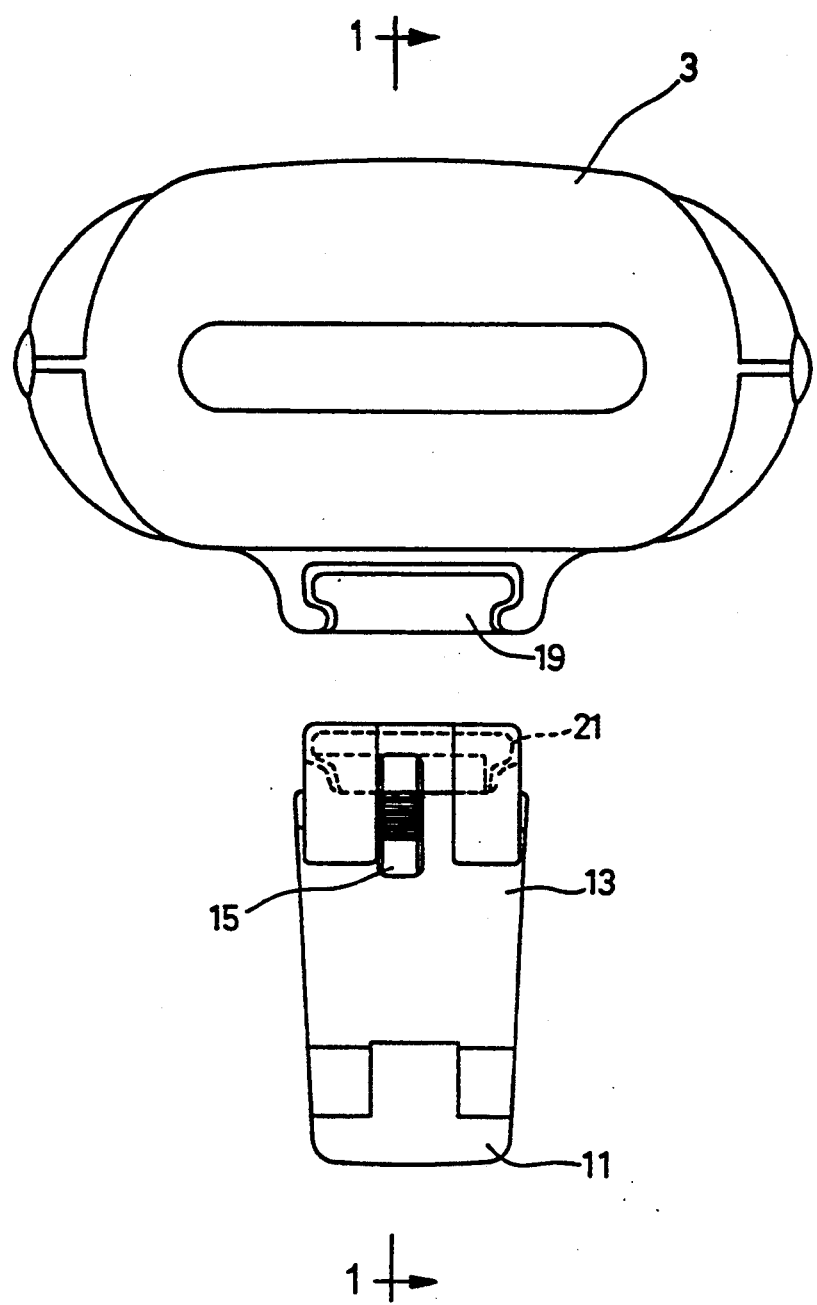
FIG. 3 is a perspective view taken from the line III—III of FIG. 2.

FIG. 2 shows a structure of a head lamp body and a bracket to be attached to a part of a bicycle in accordance with one embodiment of the present invention, and FIG. 3 is a rear view taken from the line III—III of FIG. 2.

Referring to FIG. 2, head lamp body 1 includes a lens portion 5 for irradiating ahead the light emitted from a bulb provided in front, a battery case 3 to be accommodated at a position opposite to lens portion 5 attached thereto and a groove portion 19 partially provided with a fitting portion 28 at its lower portion. The battery case 30 is comprised of cooperating body portions 33 and 35.

A bracket 7 includes attaching pieces 11 and 13 rotatable around a pin 9, a bolt 14 for fastening these attaching pieces, an attaching rubber 12 for fixing the bracket 7 rigidly on a handle or the like of a bicycle, a rail-like protruding portion 21 fitted in a groove 19 of head lamp body 1, a protruding portion 22 provided at a portion of the protruding portion 21 to be fitted in a fitting portion 28 formed at the groove 19 of head lamp body 1, and a lever 15 for moving protruding portion 22 in a direction penetrating through this sheet. Attachment of head lamp body 1 on a bicycle or the like is effected by fitting, in a sliding manner, groove 19 of head lamp body 1 to the rail-like protruding portion 21 of bracket 7 fixed on a handle or the like of the bicycle. This fitting results in fitting between protruding portion 22 and fitting portion 28 as well. Thus the head lamp body 1 is attached to bracket 7. As for detachment of head lamp body 1 from bracket 7, by moving lever 15 to the right direction in FIG. 3, fitting between protruding portion 22 and fitting portion 28 is released, and accordingly, by sliding groove portion 19 along the rail-like protruding portion 21, head lamp body 1 can be detached from bracket 7.

Figure 1:
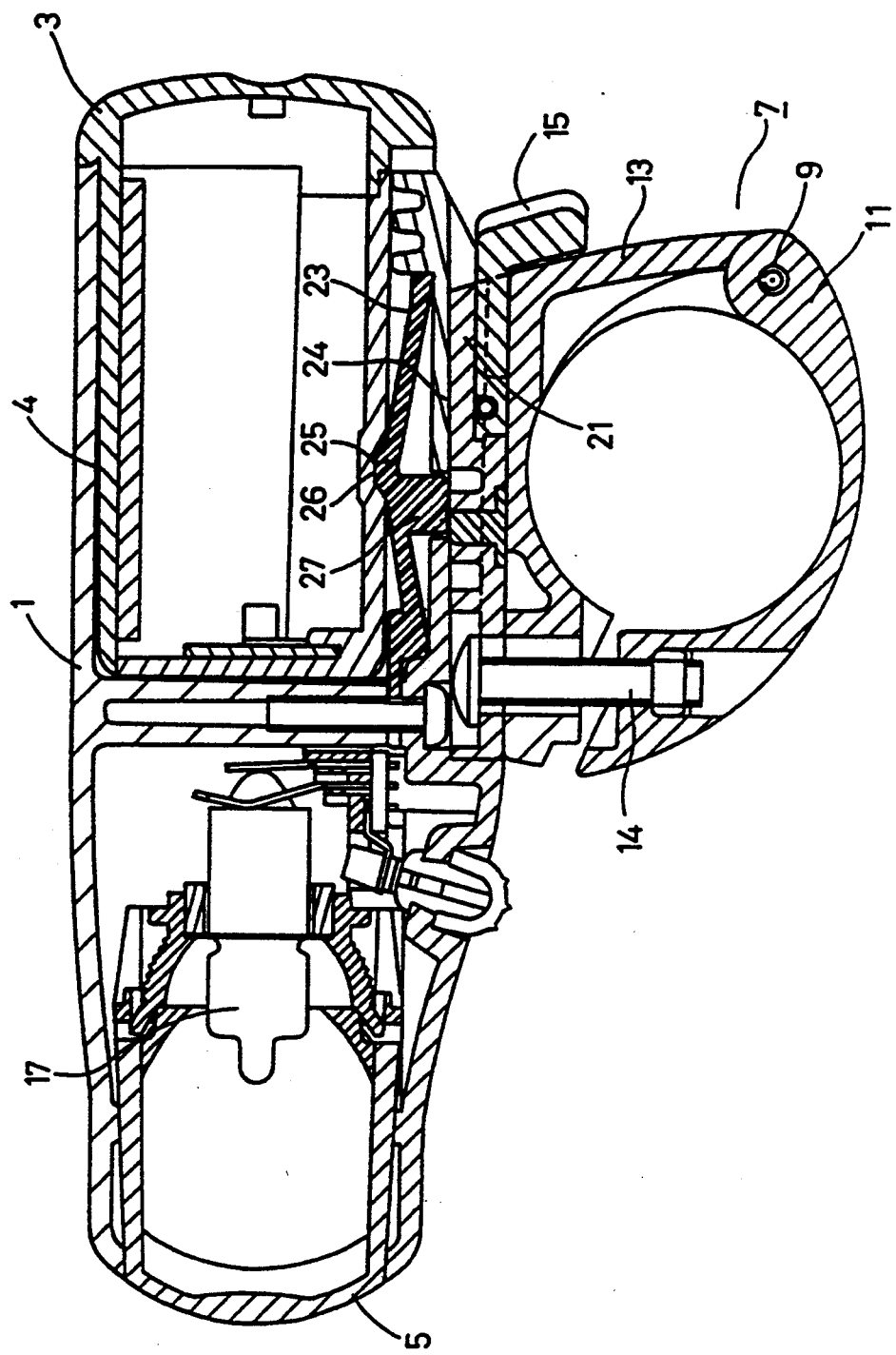
FIG. 1 is a cross section showing a state of attachment of a component for a bicycle or a motorcycle in accordance with one embodiment of the present invention.
Figure 4:
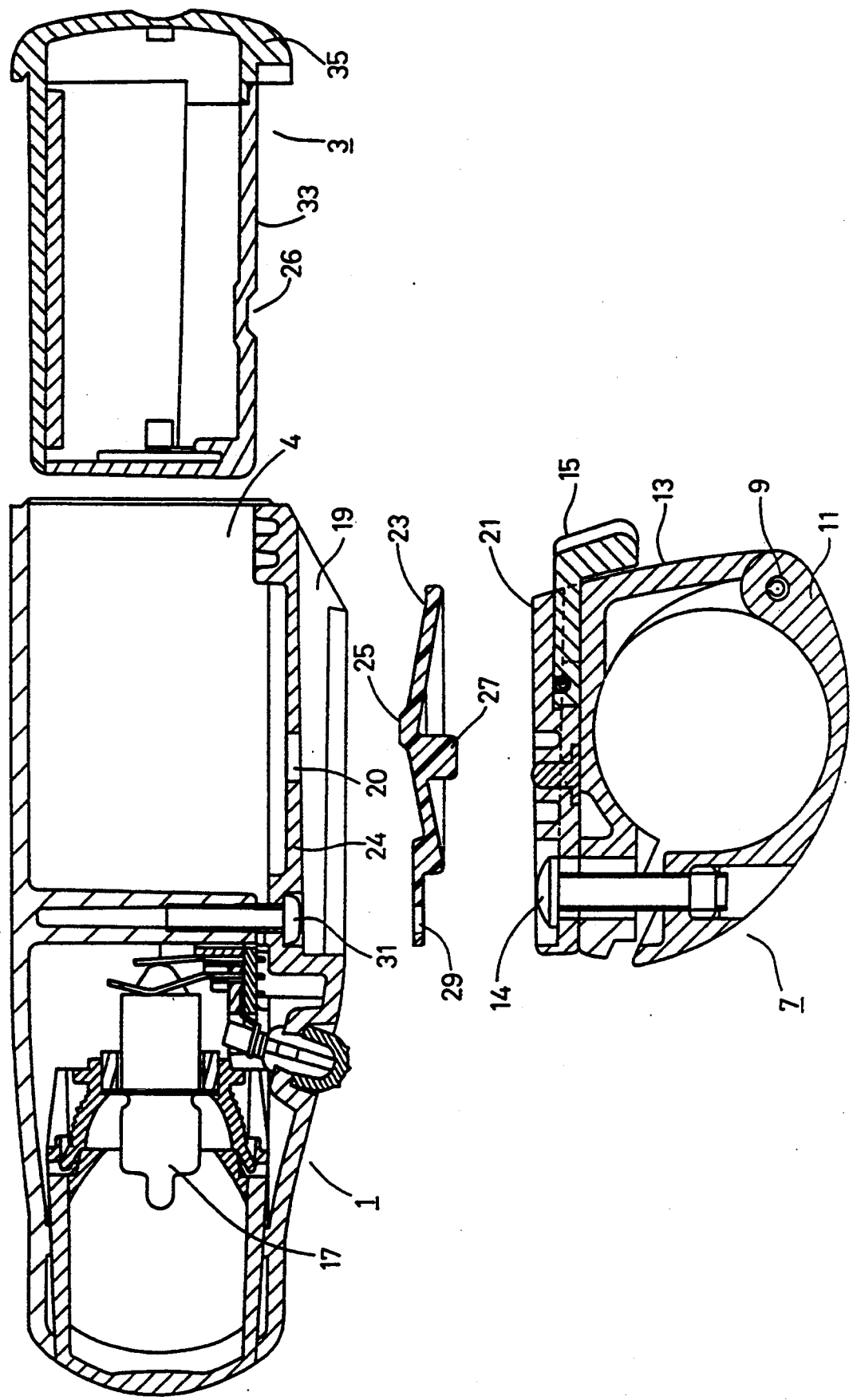
FIG. 4 is a cross section of the component for a bicycle shown in FIG. 1 separated to several parts.

FIG. 1 is a cross section taken along the line I—I of FIG. 3 which shows a cross sectional structure with the head lamp body 1 being fitted with bracket 7. FIG. 4 corresponds to the cross section of FIG. 1, showing the cross section of each of head lamp body 1, battery case 3, bracket 7 and stopper 23 detached respectively.

Referring to these figures, internal structure of the battery case attaching unit in accordance with one embodiment of the present invention will be described.

The structure around bulb 17 of head lamp body 1 is the same as that of the prior art, and the structure of battery case 3 is also the same as that of the prior art. In this embodiment, the structure of stopper 23 is different from the conventional example. More specifically, stopper 23 is the same as the prior art example in that it is formed of a resilient body such as ebonite, but different from the prior art in that a protrusion 27 is formed in a direction opposite to the direction of protrusion 25. At a stopper holding portion 24 of the lower surface of battery case housing 4 of head lamp body 1, an opening 20 corresponding to protrusion 27 of stopper 23 is provided. In the prior art example, stopper 23 was completely accommodated in battery case housing 4 of head lamp body 1. By contrast, in this embodiment, protrusion 27 of stopper 23 faces externally through opening 20, that is, faces groove portion 19. The structure of bracket 7 is basically the same as that shown in the prior art. The stopper 23 is held in place by pin 31 which extends through an opening 29 in stopper 23 into an opening in the body 1.

Figures 5, 6:
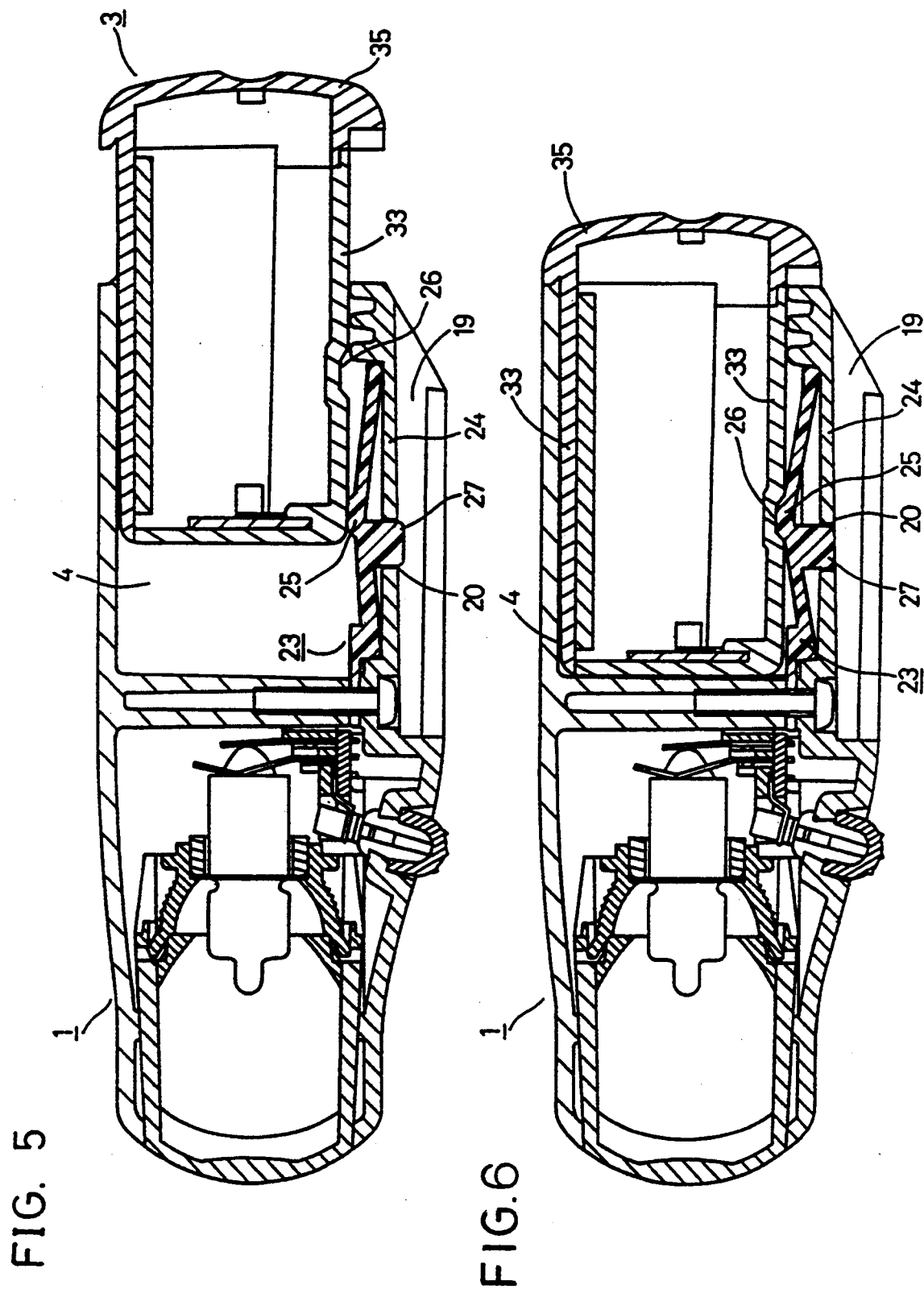
FIG. 5 is a cross section showing the state of internal change when battery case 3 is beginning to be inserted into the component for a bicycle of FIG. 1.
FIG. 6 is a cross section showing the battery case 3 attached in the component for a bicycle of FIG. 1.
Figure 7:
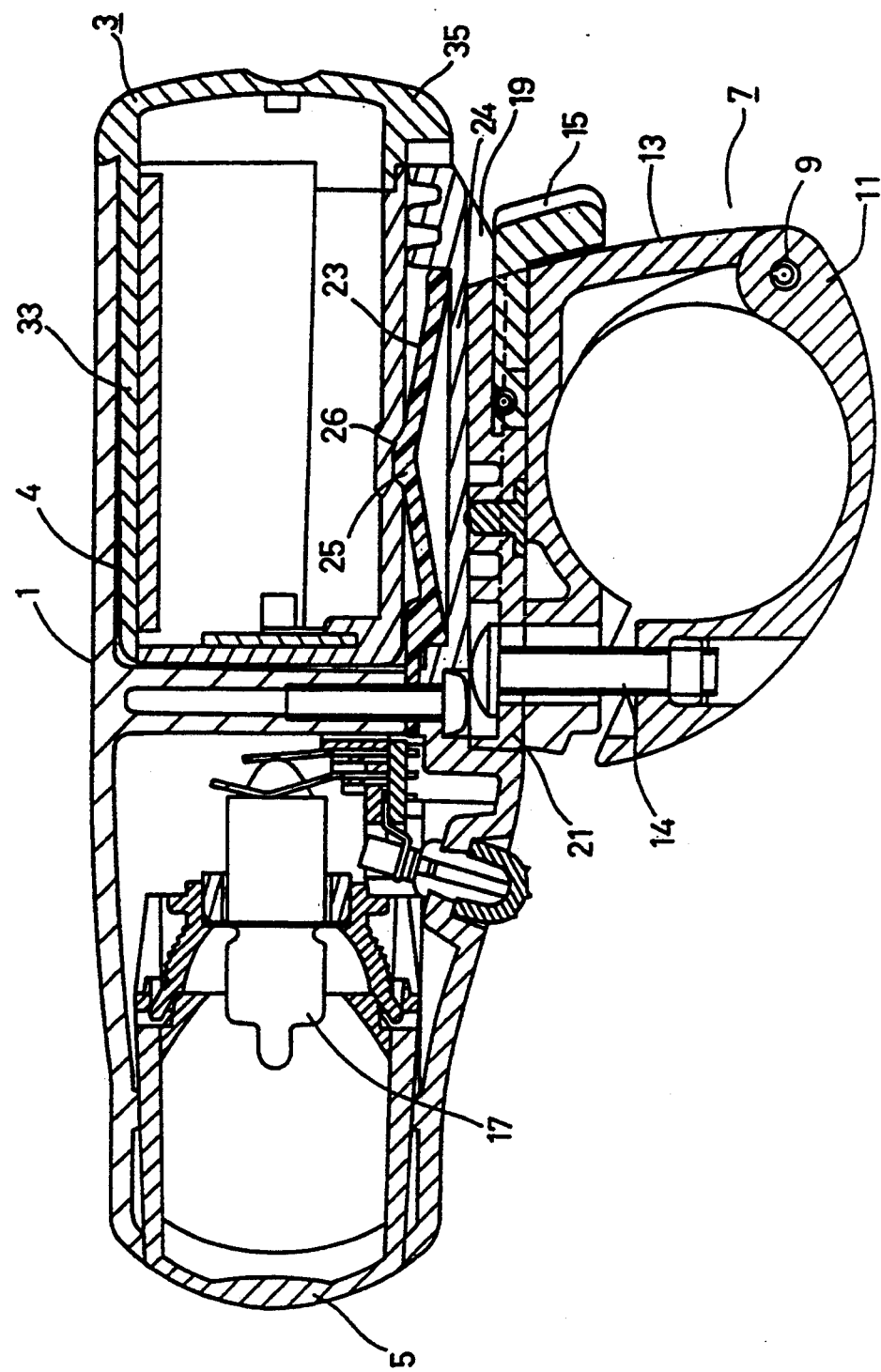
FIG. 7 is a cross section showing an internal structure of a conventional component for a bicycle.

FIG. 5 shows the state of internal change when battery case 3 is inserted into the structure of FIG. 1.

The internal change when battery case 3 is accommodated in battery case housing 4 will be described with reference to FIGS. 5 and 1.

As shown in FIG. 5, battery case 3 is gradually inserted to housing 4 and a tip end of inserting portion 33 of battery case 3 is brought into contact with protrusion 25 of stopper 23. Consequently, protrusion 25 of stopper 23 tends to move downward against resilient force. At this time, protrusion 27 also tends to move downward. However, since there is opening 20 corresponding to protrusion 27 at stopper holding portion 24, downward movement of protrusion 27 is not prevented.

When insertion of battery case 3 into housing 4 is completed, recess 26 formed at inserting portion 33 comes to correspond to protrusion 25, and thus protrusion 25 which has been forced downward is fitted in recess 26 by its resilient force, and the original state of stopper 23 before insertion of battery case 3 is resumed. FIG. 6 shows this state. At this state, since protrusion 27 of stopper 23 is returned to the original position as shown in the figure, it does not protrude to the side of groove 19 from stopper holding portion 24, and its position is kept on the same plane as the lower surface of stopper holding portion 24.

FIG. 1 shows the state of head lamp body 1 attached to bracket 7 in the state of FIG. 6. As is apparent from the figure, stopper holding portion 24 at the lower surface of head lamp body is in tight contact with the rail-like protrusion 21 on the top surface of bracket 7. Therefore, in this state, protrusion 27 of stopper 23 cannot move downward any longer, which means that fitting between protrusion 25 of stopper 23 and recess 26 formed at portion 33 of battery case 3 is firmly kept. Therefore, unless attachment of head lamp body 1 to bracket 7 is released, there is no possibility of slipping of battery case 3 from head lamp body 1.

Although a head lamp is described as a component for a bicycle in the above embodiment, the present invention can be similarly applied to any other components for bicycles or motorcycles which use a battery case.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A battery case attaching unit, comprising:
   an attaching piece adapted to be fixed on a part of a bicycle or a motorcycle;
   a component for the bicycle or the motorcycle detachably fitted with said attaching piece, said component including a housing;
   a battery case accommodating a battery therein, which can be inserted into said housing of said component for the bicycle or the motorcycle; said battery case having a recess portion therein; and a stopper provided in said housing between said housing and said battery case and including a first protrusion fitting into the recess portion provided in said battery case, said stopper including a second protrusion on the stopper facing in an opposite direction and extending through an opening in the housing for engaging a portion of said attaching piece, and, said second protrusion on the stopper moving in a direction toward a portion fitting with said attaching piece when said battery case is gradually inserted into the housing and said first protrusion returning to an original position when accommodation of said battery case is completed, and for preventing slipping of said battery case from said housing; said portion of said attaching piece engaging said second protrusion and preventing movement of said first protrusion of said stopper from said recess in said battery case when said component for the bicycle or the motorcycle is fitted in said attaching piece, with said battery case accommodated in said housing.

2. The attaching unit according to claim 1, wherein said stopper is formed of a resilient body having an inverted V shaped cross section with said first protrusion being the vertex.

3. The attaching unit according to claim 1, wherein said second protrusion is slidable into said opening and moveable in a direction relative to the portion to be fitted with said attaching piece through said opening, as said battery case is inserted into said housing.

4. The attaching unit according to claim 3, wherein a portion of said attaching piece prevents movement of said second protrusion through said opening, when said component for the bicycle or the motorcycle is fitted in said attaching piece.

5. The attaching unit according to claim 1, wherein said component for the bicycle or the motorcycle includes a head lamp.

6. A battery case attaching unit, comprising:
a battery case accommodating a battery therein; a housing receiving said battery case; attaching means for supporting said housing; and a stopper in the housing and operable between the housing and the attaching means for preventing slipping of the battery case from the housing, a first protrusion on said stopper, a recess portion on said battery case for receiving said first protrusion, a second protrusion on said stopper extending in a direction opposite said first protrusion, an opening in said housing for receiving said second protrusion, whereby, when said battery casing is inserted into said housing for engaging said first protrusion on said stopper into said recess portion, said second protrusion is movable into said opening, and when the housing is supported on the attaching means, the second protrusion is fixed and the first protrusion is fixed in the recessed portion to prevent the battery case from slipping from the housing.

* * * * *